Figure 1:
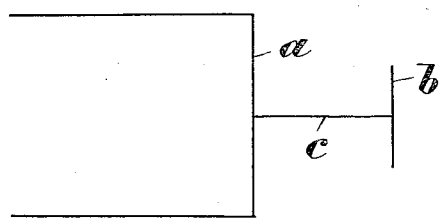

L. CONSTANTIN.
MEANS FOR REDUCING THE RESISTANCE TO THE PASSAGE OF VEHICLES IN FLUIDS.
APPLICATION FILED MAR. 18, 1912.

1,065,506. Patented June 24, 1913.

UNITED STATES PATENT OFFICE.

LOUIS CONSTANTIN, OF PARIS, FRANCE.

MEANS FOR REDUCING THE RESISTANCE TO THE PASSAGE OF VEHICLES IN FLUIDS.

1,065,506.   Specification of Letters Patent.   Patented June 24, 1913.

Application filed March 18, 1912. Serial No. 684,585.

*To all whom it may concern:*

Be it known that I, LOUIS CONSTANTIN, a citizen of the Republic of France, residing at 23 Rue de Villejust, Paris, France, have invented certain new and useful Improvements in Means for Reducing the Resistance to the Passage of Vehicles in Fluids, of which the following is a specification.

It is known that the resistance to movement of vehicles in water or in air can be reduced by giving a fine formation to their fore bodies. This arrangement whether it be applied to ships or to terrestrial or aerial vehicles comprises between the front ridge or extreme point of penetration of the vehicle and its body portion a connection constituted by inclined walls or surfaces without any break. The bows formed are necessarily but little or inefficiently utilizable and constitute an increase of the dead weight of the vehicle which is in no wise compensated for by a corresponding increase of carrying capacity. Furthermore, an existing vehicle cannot be improved in this respect except by completely converting the bows thereof which is not always possible. As an example an automobile vehicle with a closed body (a limousine for example) may be cited; here there can be no question of obstructing the view completely by fitting to the body bows with fine lines integral with this body.

The present invention has for its object in the first place to permit of constructing very compact vehicles, that is to say vehicles with a high specific carrying capacity but such that owing to the provision of special supplementary bows its weight and bulk are relatively small and the resistance to penetrating fluids inconsiderable; in the second place the invention aims at reducing the resistance to penetrating fluids in the case of existing vehicles without considerably increasing their weight and without necessitating a too radical transformation.

This invention is based upon the fact that the fluid streams thrown off laterally by a body in movement continue to be deflected for a certain distance after they are out of contact with the said body and that they cause the strata of fluid that they encounter to participate in this deflection. If a screen of appropriate section less than that of the midship frame be available at an appropriate distance in front of a vehicle the streams of fluid thrown off by this screen will cause other streams to be deflected away from the path of the vehicle which without this screen would have encountered the vehicle in opposing resistance to it. It follows that the said vehicle will no longer have to overcome the resistance corresponding to a column of fluid of the same section as its midship frame but only the resistance corresponding to a column of fluid of the same section as the screen. Accordingly there will be a diminution of the resistance. It will also be understood that this diminution will increase in proportion as the resistance of the screen itself to the advance is less, provided of course that the power of lateral deflection of the screen is not diminished. This result will be obtained by constituting the walls of the screen by a dihedral ridge angle horizontal or vertical according to circumstances or by an appropriate cone. A very marked amount of power of lateral deflection can also be obtained if the screen instead of being constituted by a single continuous surface consists of a series of juxtaposed plates preferably curved in profile, in such a manner as to avoid excessively sudden shocks and deviations which invariably entail loss of energy. Furthermore, with this arrangement the resistance to the advance will be reduced owing to the fact that the pressure exerted by the fluid upon the front face of the plates will be partly compensated for by the pressure exerted by it upon the rear face.

Figure 2:
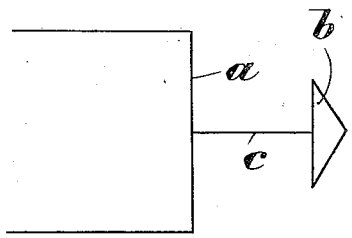
Figure 3:
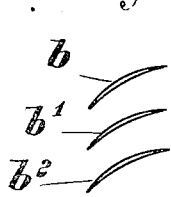
Figure 4:
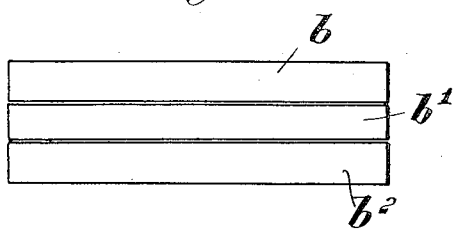
Figures 5, 6:
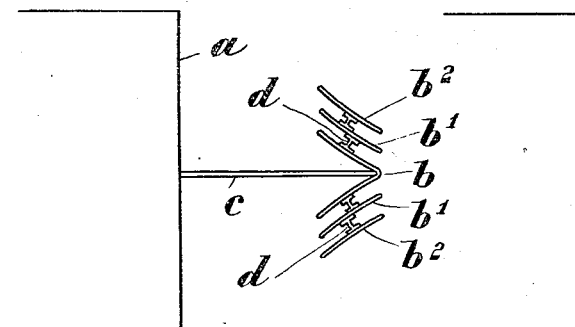

Some embodiments of the invention are diagrammatically illustrated by way of example in the accompanying drawings, in which:

Figure 1 represents a discoid screen fixed in front of a vehicle. Fig. 2 represents the front of a vehicle provided with a conical screen. Figs. 3 and 4 show in side and front elevation respectively plates arranged parallel in such a manner as to constitute lamellar bows. Fig. 5 represents to a smaller scale the front of a vehicle provided with lamellar bows the plates of which are arranged on either side of a median ridge. Fig. 6 represents the front of a vehicle provided with conical lamellar bows represented in vertical section.

In these figures *a* represents the front of a vehicle of any kind intended to travel on the ground, in the air or in the water, $b$ is the screen or bows and $c$ a support which connects the screen with the vehicle.

In Figs. 3, 4, 5 and 6 the plates of which the bows are formed are marked $b$ $b'$ and $b^2$ and in Figs. 5 and 6 $d$ represents the attachments which connect the plates one with the other. With bows formed of a single series of parallel plates arranged as shown in Figs. 3 and 4 the fluid can only be deviated in a single direction which can be varied by altering the position of the bows. The bows shown in Fig. 5 are intended to deflect the fluid either on both sides or above and below a vehicle according to the position imparted to them relatively to the latter. With conical bows like those represented in Fig. 6 the fluid is deflected all around the vehicle.

The form and arrangement of the plates may be varied within wide limits without departing from the principle of the invention.

What I claim and desire to secure by Letters Patent of the United States is:—

1. In combination with a vehicle, bows of smaller section than that of the vehicle, constituted by several inclined walls parallel one with the other and separated one from the other by a vacant space, the attachments connecting these walls one with the other and a support of smaller section than that of the bows fixed in front of the vehicle in line with its longitudinal axis and connecting the bows with the vehicle.

2. In combination with a vehicle, bows of smaller section than that of the vehicle formed by several inclined curved walls parallel one with the other and separated one from the other by a vacant space, attachments connecting these walls one with the other and a support of smaller section than that of the bows fixed in front of the vehicle in line with its longitudinal axis and connecting the bows with the vehicle.

3. In combination with a vehicle, bows of smaller section than that of the vehicle presenting a ridge and on each side thereof several inclined walls parallel one with the other and separated one from the other by a vacant space, attachments connecting these walls one with the other and a support of smaller section than that of the bows fixed in front of the vehicle in line with its longitudinal axis and connecting the bows with the vehicle.

4. In combination with a vehicle, bows of smaller section than that of the vehicle presenting a ridge and on either side thereof a number of inclined curved walls parallel one with the other and separated one from the other by a vacant space, attachments connecting the walls one with the other and a support of smaller section than that of the bows fixed in front of the vehicle in line with its longitudinal axis and connecting the bows with the vehicle.

In testimony whereof I affix my signature in presence of two witnesses.

LOUIS CONSTANTIN.

Witnesses:
  ADOLPHE VOGEL,
  N. V. HIEPATRIM.